United States Patent [19]

Takeuchi et al.

[11] Patent Number: 5,183,988
[45] Date of Patent: Feb. 2, 1993

[54] ELECTRIC DISCHARGE MACHINING METHOD

[75] Inventors: Hiroshi Takeuchi; Tomoko Sendai; Yozo Sakai, all of Aichi, Japan

[73] Assignee: Mitsubishi Denki K.K., Tokyo, Japan

[21] Appl. No.: 514,644

[22] Filed: Apr. 24, 1990

[30] Foreign Application Priority Data

Apr. 24, 1989 [JP] Japan .................... 1-103952

[51] Int. Cl.$^5$ .............. B32H 1/02; B32H 7/16; B32H 7/20
[52] U.S. Cl. ................. 219/69.17; 219/69.13
[58] Field of Search ............ 219/69.13, 69.17, 69.18, 219/69.19, 69.16; 364/474.04

[56] References Cited

U.S. PATENT DOCUMENTS

| | | | |
|---|---|---|---|
| 3,943,321 | 3/1976 | Pfau et al. | 219/69.18 |
| 4,078,163 | 3/1978 | Bell, Jr. et al. | 364/474.04 |
| 4,361,745 | 11/1982 | Rupert et al. | 219/69.13 |
| 4,370,536 | 1/1983 | Kruth | 219/69.17 |
| 4,504,722 | 3/1985 | Kishi et al. | 219/69.18 |
| 4,559,434 | 12/1985 | Kinoshita | 219/69.17 |
| 4,798,929 | 1/1989 | Itoh | 219/69.12 |
| 4,800,248 | 1/1989 | Futamura et al. | 219/69.19 |
| 4,970,363 | 11/1990 | Obara | 219/69.12 |

FOREIGN PATENT DOCUMENTS

| | | |
|---|---|---|
| 50-500 | 1/1975 | Japan . |
| 59-124519 | 7/1984 | Japan . |
| 8100532 | 3/1980 | PCT Int'l Appl. ....... 219/69.13 |
| 2041574 | 9/1980 | United Kingdom ....... 219/69.13 |

Primary Examiner—Geoffrey S. Evans
Attorney, Agent, or Firm—Sughrue, Mion, Zinn, Macpeak & Seas

[57] ABSTRACT

An electric discharge machining method which is practiced with stable machining condition and with high machining efficiency. The condition which, in machining a workpiece, tends to place the gap between the electrode and workpiece in unstable state is detected, and the period of time for which the condition thus selected lasts is set so that the discharge energy of a pulse voltage applied across the electrode and the workpiece is reduced for the period of time thus set. Therefore, in the electric discharge machining method of the invention, the machining operation is maintained stable with high machining efficiency at all times.

7 Claims, 15 Drawing Sheets

▨ : SLUDGE

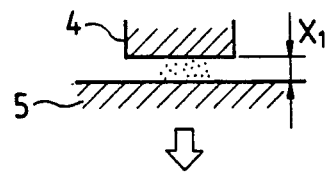
FIG. 15(a)
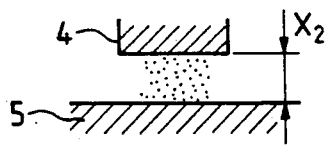
FIG. 15(b)
FIG. 16
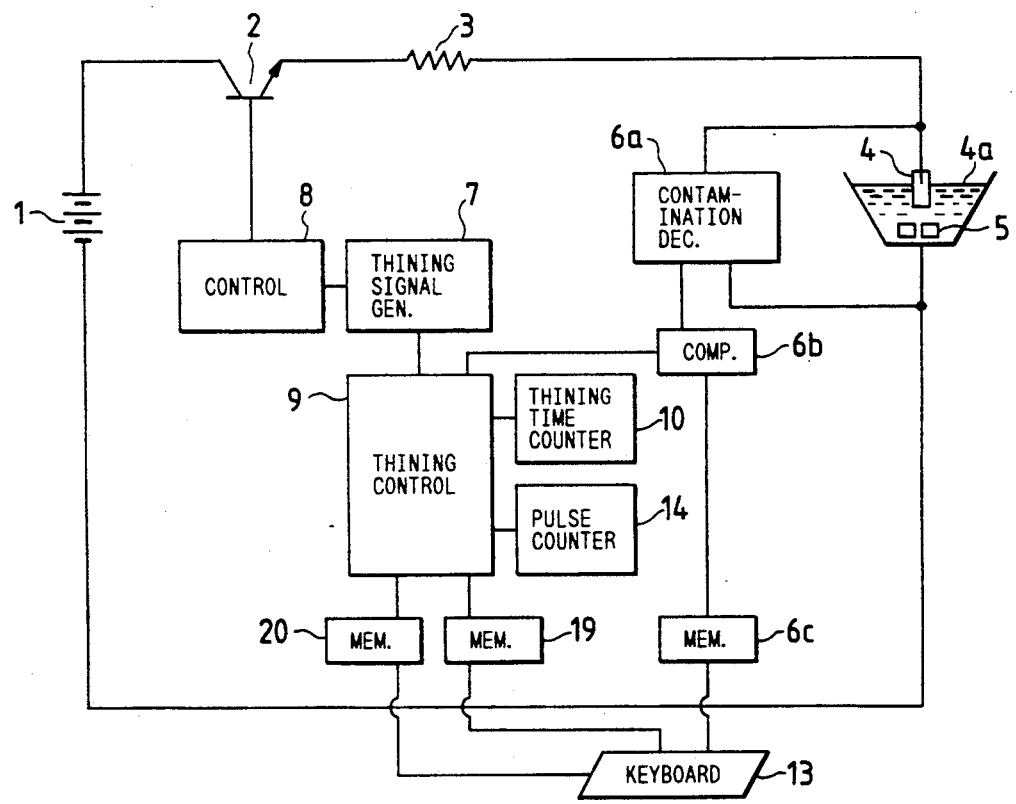

○ : AIR FORM
⋮ : SLUDGE

ELECTRIC DISCHARGE MACHINING METHOD

BACKGROUND OF THE INVENTION

This invention relates to an improvement of an electric discharge machining method.

In general, in an electric discharge machining operation, a short-circuit occurs between the wire electrode and the workpiece with considerably high probability for instance because the discharge machining traces often inflate, or waste materials, such as sludge, are formed during machining.

If a short-circuit occurs in the region of the workpiece where high pulse current is used as in the case of roughing machining, or high frequency machining pulse voltage is employed, then the average current is increased, and therefore the Joule heat thereof may damage the electrode and the workpiece, or the average current thus increased may damage the transistors in the electric discharge machine.

In order to overcome this difficulty, Japanese Patent Application (OPI) No. 500/1975 (the term "OPI" as used herein means an "unexamined published application") for instance has been disclosed in the art.

In the prior art, the conditions of the gap between the electrode and the workpiece are detected so that a certain number of voltage pulses are eliminated from the train of voltage pulses according to the conditions of the gap thus detected.

One example of a conventional electric discharge machine of this type is as shown in FIG. 21. In FIG. 21, reference numeral 1 designates a DC power source; 2, a switching transistor; 3, an emitter resistor; 4, a tool electrode; 5, a workpiece; 6, a short-circuit detecting device; 7, a discharging pulse thinning signal generating device; and 8, a control device for selectively applying voltage to the base of the switching transistor 2 to render the latter on and off. In a stable electric discharge machining operation, the transistor 2 is rendered conductive in response to a control signal from the control device 8, to apply discharging current through the transistor 2 and the emitter resistor 3 to the gap between the electrode 4 and the workpiece 5 to machine the latter 5.

In this case, the electric discharge machining operation advances as shown in FIG. 22. Electric discharge occurs first where, as shown in FIG. 22(a), is made most suitable for electric discharge for instance because of an uneven part of the workpiece' surface or decomposition of materials contained in the machining solution. Next, electric discharge occurs between the electrode and the workpiece in such a manner that it is spread therein. In this case, the workpiece will be stably machined as shown in FIG. 22(c).

When, on the other hand, waste materials and other decomposed materials are deposited at a position as shown in FIG. 22(d), then electric discharge is caused concentrating at one position. As a result, a electric discharge trace is markedly formed at the position resulting in an occurrence of defects in the machined surface.

If a short-circuit occurs between the electrode 4 and the workpiece 5 because of waste materials for instance, then it is detected by the short-circuit detecting device 6, which applies a detection signal to the discharge pulse thinning signal generating device 7. Thereupon, the device 7 supplies the discharge pulse thinning signal, which is applied to the control device 8. As a result, rendering the transistor conductive is suspended for a period of time corresponding to a predetermined number of voltage pulses from the next one. That is, when a short-circuit occurs between the electrode and the workpiece, the predetermined number of voltage pulses are removed from the train of voltage pulses, whereby the concentration of electric discharge to one position is eliminated, and accordingly failures in electric discharge machining can be prevented, such as damaging workpieces.

An electric discharge machine generally employs a method of maintaining the voltage of the machining gap substantially constant, thereby maintaining the machining gap constant. In the method, in the case where the machining gap is high in the degree of insulation for instance because the machining solution in the machining gap is clean, the machining gap is controlled to be narrow; whereas in the case where the degree of insulation is low for instance because a number of waste materials are accumulated in the machining gap, the machining gap is controlled to be wide.

For instance at the start of an electric discharge machining operation, a clean machining solution is in the machining gap, and therefore the machining gap is considerably high in the degree of insulation, and it is therefore controlled to be narrow. Accordingly, during the initial period of an electric discharge machining operation, a short-circuit is liable to occur, with high percentage, at the machining gap by the inflation of a discharge machining trace. Therefore, application of high frequency voltage pulses, in this case, will cause electric discharge frequently.

In the initial period of a electric discharge machining operation, the removal of voltage pulses in response to the occurrence of a short-circuit in the machining gap will reduce the probability of failure in discharge machining. However, the method suffers from a difficulty that, when the machining operation becomes normal by the removal of voltage pulses after the occurrence of the short-circuit, the frequency of the voltage pulses is increased again, thus causing short-circuits again. This is repeatedly carried out as shown in FIG. 23.

In FIG. 23, reference character B designates a train of voltage pulses for discharge machining. Upon occurrence of a short-circuit, a predetermined number of voltage pulses D are removed from the train of voltage pulses B. That is, the conventional method in which, when a short-circuit occurs in the machining gap because of the unsatisfactory conditions thereof, a certain number of voltage pulses are removed, and when the machining conditions become stable, the machining operation is normally carried out again, suffers from a difficulty that, if the machining condition is on the border line between stable condition and unstable condition, it is difficult to change the machining condition into its original stable condition, and the machining efficiency is lowered by repeatedly removing the certain number of voltage pulses as shown in FIG. 23.

When, at the start of an electric discharge machining operation, a short-circuit occurs in the above-described manner, then the application of current is suspended, and the electrode is mechanically moved away from the workpiece to eliminate the contact therebetween which is caused by the inflation of the discharge machining trace for instance. Thereafter, the electrode is set close to the workpiece again. Hence, in the conventional method, it is difficulty to quickly restore the machining condition, thus, the machining efficiency is accordingly low.

SUMMARY OF THE INVENTION

Accordingly, an object of this invention is to eliminate the above-described difficulties accompanying a conventional electric discharge machining method. More specifically, an object of the invention is to provide an electric discharge machining method which is practiced with stable machining condition and with high machining efficiency.

In a first example of an electric discharge machining method according to the invention, the condition which, in machining a workpiece, tends to place the gap between the electrode and workpiece in an unstable state is detected, and the period of time for which the condition thus selected lasts is set so that the discharge energy of a pulse voltage applied across the electrode and the workpiece is reduced for the period of time thus set.

In a second example of the electric discharge machining method according to the invention, the amount of state of the gap between the electrode and the workpiece is detected, and the workpiece is machined for a predetermined period of time with the energy which is selected according to the amount of state thus detected and machining conditions.

In a third embodiment of the electric discharge machining method according to the invention, the amount of state of the gap between the electrode and the workpiece is detected, and the electric discharge energy is controlled stepwise so that the amount of state thus detected is maintained at a predetermined reference value.

In the first example of the electric discharge machining method according to the invention, the machining energy is reduced for the period of time that the condition causing a machining operation to be unstable lasts.

In the second example of the method, a state of a machining operation is detected, and the machining operation is carried out with the electric discharge energy which is determined according to the state thus detected and machining conditions predetermined therefor.

In the third example of the method, the machining energy is controlled stepwise so that the state of the machining operation is maintained as required.

BRIEF DESCRIPTION OF THE DRAWINGS

In the accompanying drawings:

FIGS. 15(a) and 15(b) are explanatory diagrams for a description of part of the operation of the fourth embodiment;

FIG. 16 is a block diagram showing the arrangement of a fifth embodiment of the invention;

DESCRIPTION OF THE PREFERRED EMBODIMENTS

Preferred embodiments of this invention will be described with reference to the accompanying drawings.

Figure 1:
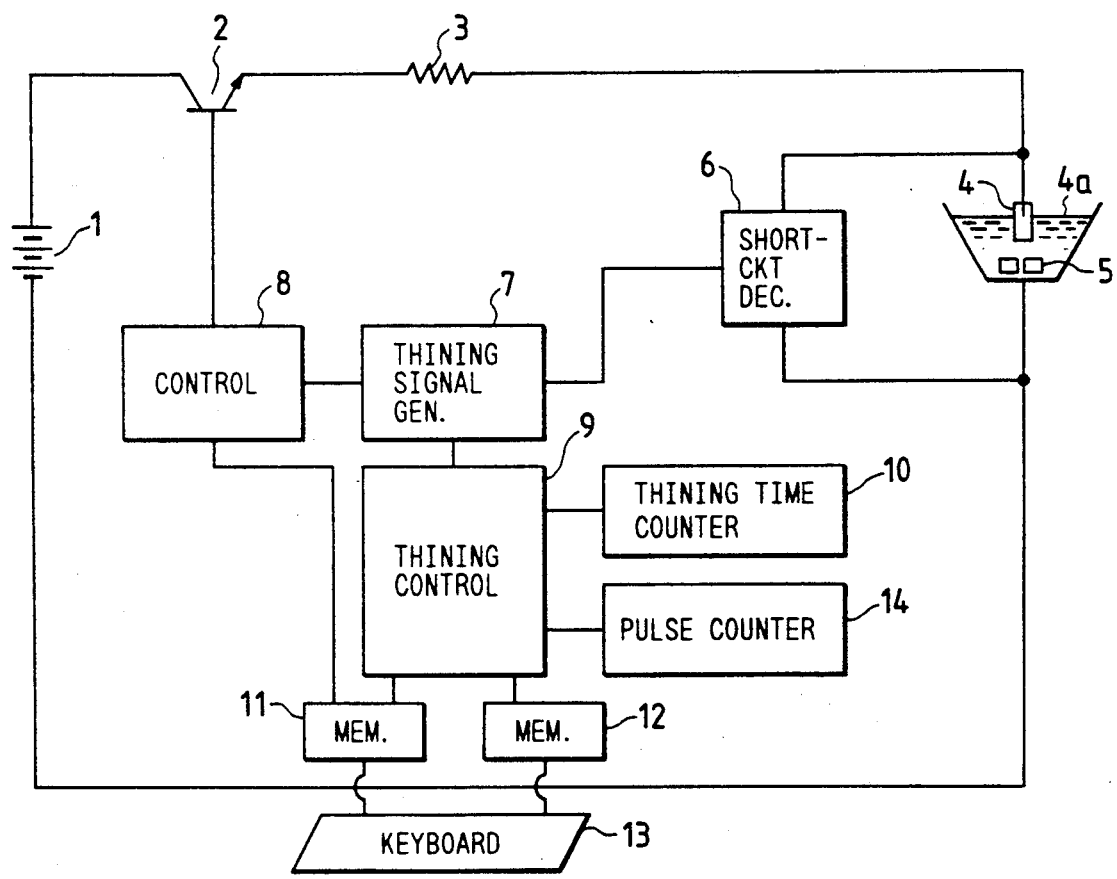
FIG. 1 is a block diagram showing the arrangement of a first embodiment of this invention.
Figure 2:
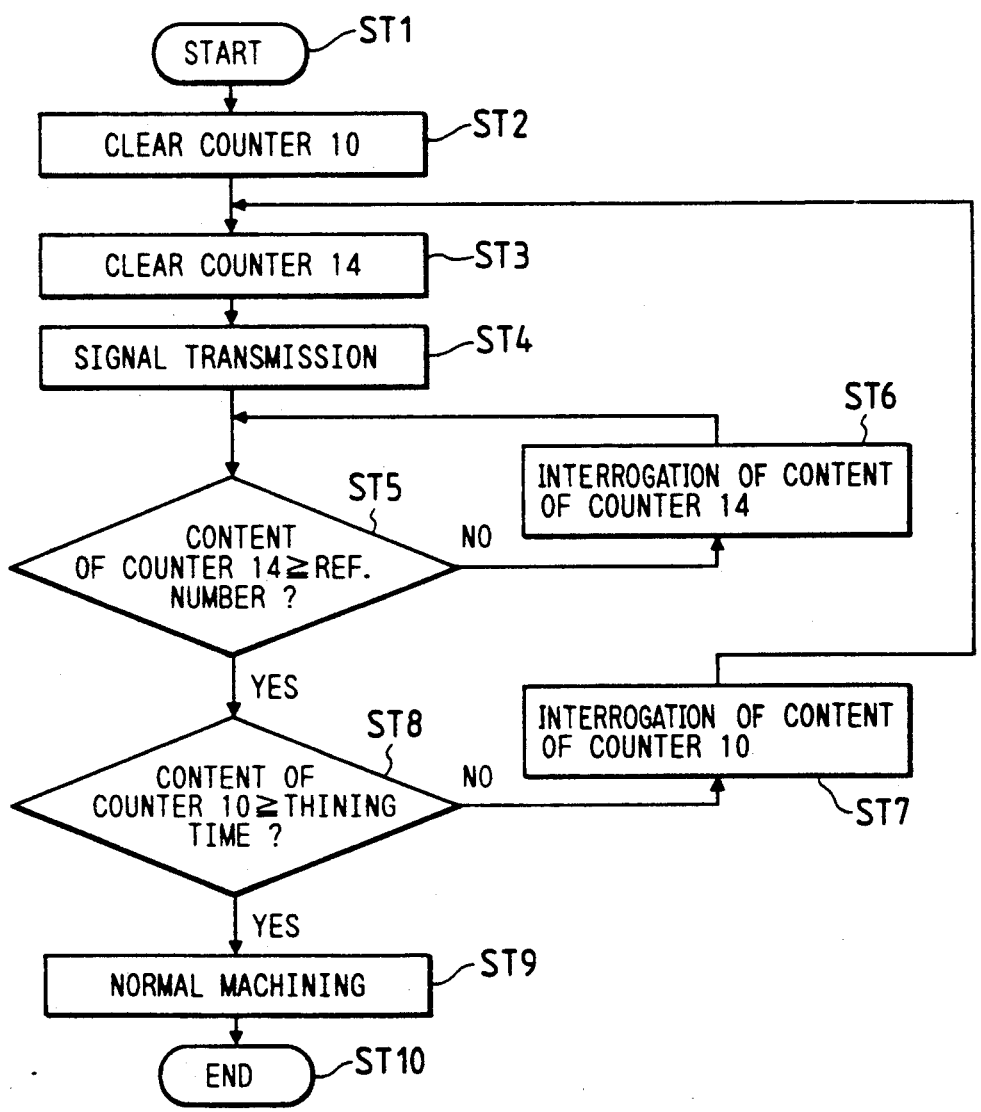
FIG. 2 is a flow chart for a description of the operation of the first embodiment shown in FIG. 1.

FIG. 1 is an explanatory diagram, partly as a block diagram, showing the arrangement of a first embodiment of the invention, and FIG. 2 is a flow chart for a description of the operation of the embodiment.

In FIG. 1, reference numeral 1 designates a DC power source; 2, a switching transistor; 4, an electrode; 5, a workpiece; 4a, a machining solution held between the electrode 4 and the workpiece 5; 6, a short-circuit detecting device; 7; a thinning signal generating device; 8, a switching transistor control device; 9, a thining control unit; 10, a thinning time counter memory; 11, an applied voltage thinning amount memory; 12, an applied voltage thinning time memory; and 13, a keyboard; and 14, a pulse counter memory. For simplification in description, those memories 10, 11, 12 and 14 will be referred to as "first, second, third and fourth memories", respectively, when applicable).

An applied voltage thinning amount and an applied voltage thinning time have been stored in the second memory 11 and the third memory 12 through the key board 13 in advance, respectively. An applied voltage thinning amount is defined by a number of pulses to be removed (thinned) and a reference number of pulses. For instance, an applied voltage thinning amount (3, 5) means that three pulses are removed from five pulses. An applied voltage thinning time means the time for which the above-described pulse removing operation is carried out repeatedly. As shown in FIG. 2, upon start of an electric discharge machining operation (ST 1), the thinning control means 9 operates to clear the contents of the first memory 10 and the fourth memory 14 (ST 2 and ST 3), and applies an instruction signal to the thinning signal generating device 7 (ST 4). In response to the instruction signal, the device 7 outputs a thinning signal, which is applied to the control device 8. In response to the thinning signal, the control device 8 renders the transistor 1 non-conductive for a period of time corresponding to the number of pulses to be removed beginning with the next pulse. At the same time, the thinning control means 9 interrogates the count value of the pulse counter memory 14 until it exceeds the reference number of pulses, so as to determine the accomplishment of one cycle of operation (ST 5 and ST 6). This one cycle of operation is repeatedly carried out until the contents of the thinning time counter memory 10 exceed those of the thinning time memory 12, and when exceeded (ST 7 and ST 8), the pulse removing operation is ended; that is, the workpiece 5 is machined according to the normal machining program which has been set without removal of voltage pulses (ST 9). Thereafter, similarly as in the conventional method, the short-circuit detecting device 6 is operated to perform a pulse removing operation in response to the occurrence of a short-circuit.

In the above-described embodiment, the applied voltage thinning amount (11) and the applied voltage thinning time (12) are applied by using the keyboard 13. However, the invention is not limited thereto or thereby; that is, the application of those data may be carried out by using an external device. In addition, the kinds and numbers of memories can also be changed freely within the scope of the invention.

In first embodiment of the invention, the pulse removing operation is forcibly carried out at the start of an electric discharge machining operation.

Figure 3A:
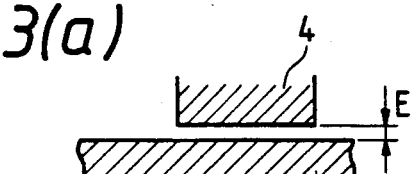
FIGS. 3(a), 3(b), 3(c), 4(a) and 4(b) are diagrams for a description of part of the operation of the first embodiment.
Figure 3B:
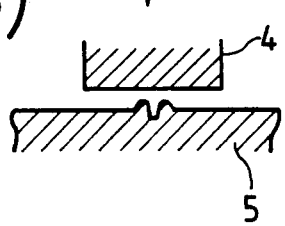
Figure 3C:
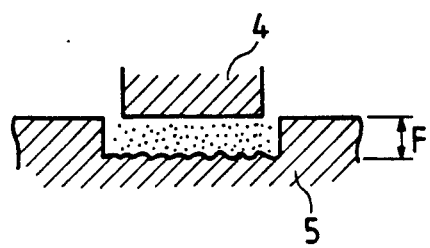

FIGS. 3(a) to (c) are explanatory diagrams each showing the states of the electrode and the workpiece in an electric discharge machining operation.

As shown in the part (a) of FIG. 3, at the start of the machining operation, no waste materials such as waste particles are formed in the gap between the electrode 4 and the workpiece 5, and the gap is narrow as indicated at E. On the other hand, as shown in FIG. 3(c), as the machining operation advances, the gap becomes wide as indicated at F. It goes without saying that the gap is filled with a machining solution.

At the start of the machining operation, there are no waste materials in the gap between the electrode 4 and the workpiece 5, and the machining solution is kept within the gap so that they are positively electrically insulated from each other. Hence, in order to cause electric discharge in the gap between the electrode and the workpiece, the distance between the electrode and the workpiece should be reduced to 10 to 50 $\mu$m.

Upon application of a voltage of 60 to 150 V across the gap, dielectric breakdown of the machining solution 4a is caused, so that electric discharge occurs therebetween.

The electric discharge occurs at the point having the smallest distance between the electrode and the workpiece where dielectric breakdown is caused most readily by voltage. In other words, the electric discharge occurs at one point at all times. Therefore, in this case, the electric discharge is locally caused, thus being liable to form steady arc. During continuous electric discharge (during machining) the electric discharge occurs in such a manner as to be spread in the gap because of the uneven surface of the workpiece or electrode and the waste materials contained in the machining solution.

In general, at the start of an electric discharge machining operation, the surface of the workpiece or electrode is even, and no waste materials are contained in the machining solution in the gap, and therefore the electric discharge is substantially not spread in the gap (cf. FIG. 3(b)).

As is apparent from the above description, at the start of an electric discharge machining operation, the machining voltage pulse removing operation is forcibly carried out, so that the frequency of occurrence of electric discharge per unitary time is decreased, the Joule heat produced per unitary time is also reduced, and the quantity of waste materials formed during machining is decreased. Accordingly, the probability is decreased that short-circuit occurs in the gap between the electrode and the workpiece (hereinafter referred to as "a machining gap", when applicable), and the electric discharge occurring at one point is smoothly spread, so that efficient and stable machining conditions can be readily obtained.

In the above description, the start of machining is selected as an example when the machining condition becomes unstable in the gap between the electrode 4 and the workpiece 5. However, during machining, the electrode may be replaced with a new one having a smooth surface, or the machining solution may be replaced with a new one containing no waste materials no foreign materials. In this case, it goes without saying that the flow chart of FIG. 2 may be equally applied thereto.

In the above-described embodiment, the time when the machining operation is liable to become unstable is selected to eliminate the occurrence of unstable machining conditions. The reason for this and method of selecting the time will be described below.

The pulse removing operation carried out at the start of an electric discharge machining operation is intended to allow the electric discharge to smoothly spread from one point. Therefore, to carry out the pulse removing operation after the machining conditions become stable with electric discharge occurring in a spread manner, may result in lowering the machining efficiency. In other words, immediately after the stable machining conditions are established, the pulse removing operation should be suspended to perform the machining operation under the normal machining electrical conditions, so as to obtain the best machining efficiency.

At the start of the machining operation, the period of time required for shifting the unstable machining condition (where the short-circuit is liable to occur) into the stable condition (where the electric discharge occurs in a spread mode) depends on the electrical conditions. This is because the inflation of the machined surface by electric discharge and the size and quantity of waste materials formed thereby depend on the machining conditions.

For instance, the size of waste materials formed by electric discharge depends on electric discharge energy, and the quantity of waste materials formed per unitary time depends on the frequency of voltage pulse. Furthermore, the inflation of the machine surface depends on electric discharge energy. This relates to the fact that electric discharge energy determine a surface roughness for a workpiece, and the inflation of the machined surface is of the order of one-third ($\frac{1}{3}$) of the surface roughness.

Figure 4A:
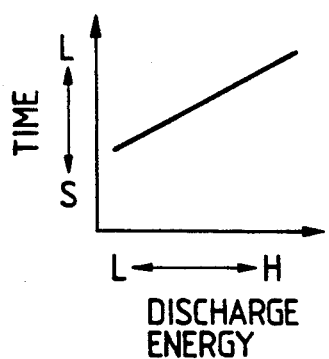
Figure 4B:
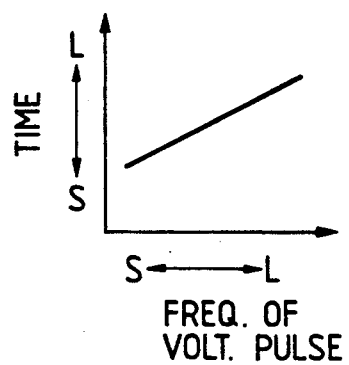

FIGS. 4(b) and 4(d) are graphical representations indicating a predetermined period of time in which the pulse removing operation is carried out at the start of the machining operation with respect to electric discharge energy, and to voltage pulse frequency, respectively. As is apparent from these graphical representations, the pulse removing time should be increased with the increasing electric discharge energy and with the increasing voltage pulse frequency.

Other embodiments of the invention will be described with reference to FIGS. 5 through 7, and FIGS. 8 through 11.

Figure 5:
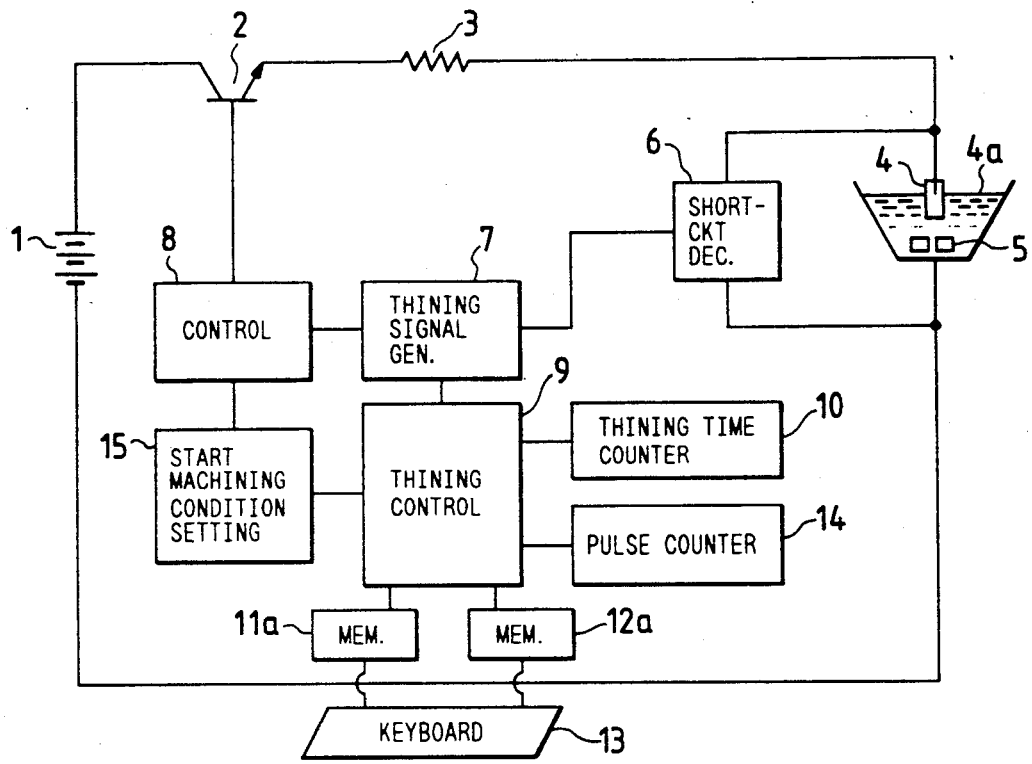
FIG. 5 is a block diagram showing the arrangement of a second embodiment of the invention.
Figure 6:
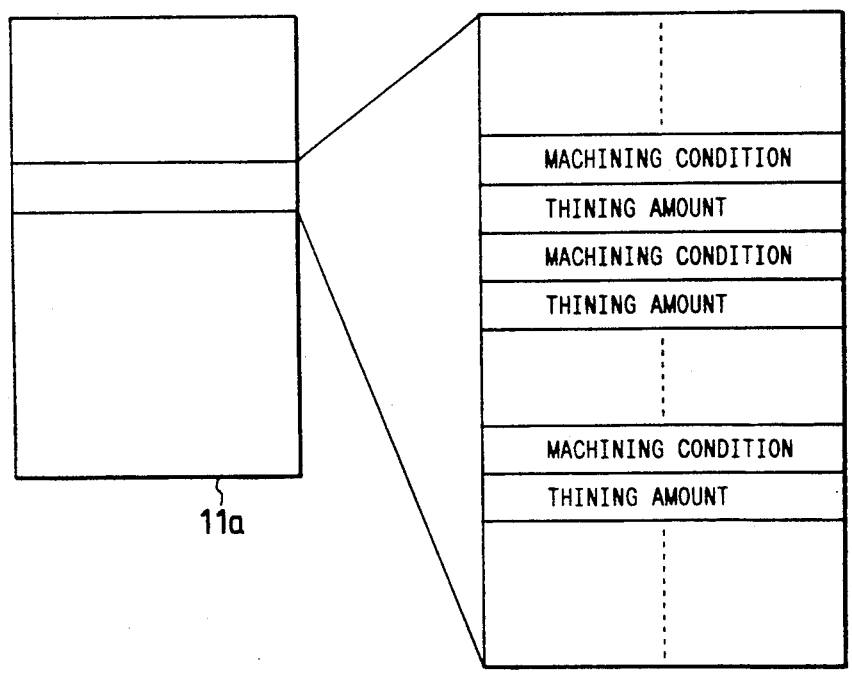
FIG. 6 is an explanatory diagram showing the contents of a memory in the second embodiment.
Figure 7:
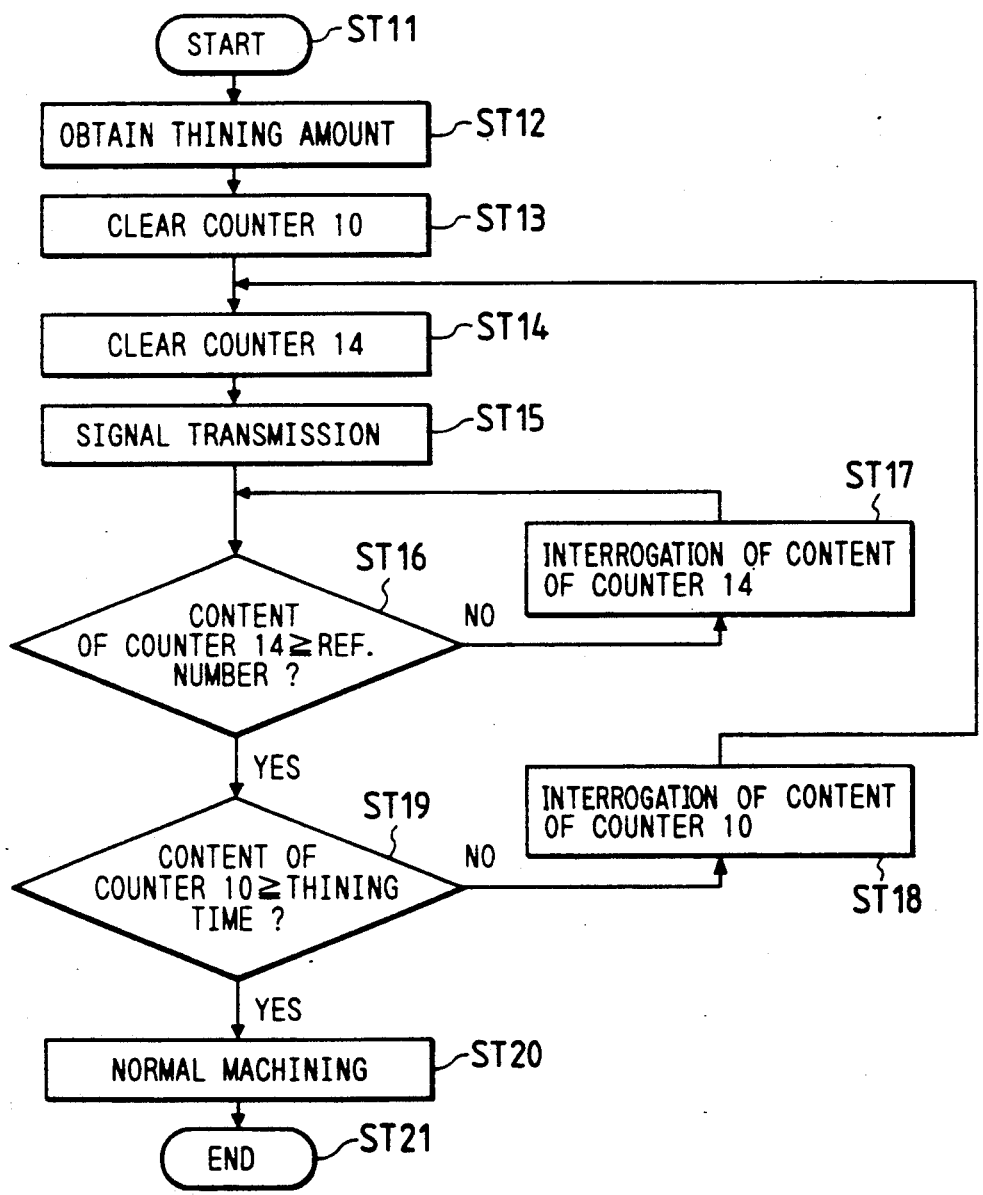
FIG. 7 is a flow chart for a description of the operation of the second embodiment.

More specifically, FIG. 5 is a block diagram showing the arrangement of a second embodiment of the invention. FIG. 6 is an explanatory diagram showing the contents of a memory. FIG. 7 is a flow chart for a description of the operation of the second embodiment.

In FIG. 5, reference numeral 2 designates a switching transistor; 4, a tool electrode; 4a, a machining solution; 5, a workpiece to be machined; 7, a thinning signal generating device; 8, a switching transistor control device; 9, thinning control means; 10, a thinning time counter memory; 11a, a machining condition and applied voltage thinning amount train memory; 12a, a thinning time memory; 13, a keyboard; 14, a pulse counter memory; and 15, a start machining condition setting means. As shown in FIG. 6, interelectrode voltage thinning amounts are stored in the memory 11a separately according to a variety of machining conditions.

The train of machining conditions and applied voltage thinning amounts, and applied voltage thinning times have been stored in the memory 11a and 12a through the keyboard 13, respectively.

Each applied voltage thinning amount is determined by the number of pulses to be removed, and the reference number of pulses. For instance, an applied voltage thinning amount (3, 5) means that three pulses are removed from five pulses. An applied voltage thinning time means the time for which the above-described pulse removing operation is carried out repeatedly.

In the second embodiment of the invention, as shown in FIG. 7, at the start of an electric discharge machining operation (ST 11), the thinning control means 9 extracts the most suitable applied voltage thinning amount out of the contents of the memory 11a according to the data provided by the start machining condition setting means 15 (ST 12), clears the contents of the thinning time counter memory 10 and the pulse counter memory 14 (ST 13 and ST 14), and applies an instruction signal to the thinning signal generating device 7 (ST 15), which outputs a thinning signal. The thinning signal thus outputted is applied to the control device 8. In response to the thinning signal, the control device 8 renders the transistor 2 non-conductive for a period of time corresponding to the number of pulses to be removed beginning with the next pulse. At the same time, the thinning control means 9 interrogates the count value of the pulse counter memory 14 until it exceeds the reference number of pulses, so as to determine the accomplishment of one cycle of operation (ST 16 and ST 17). This one cycle of operation is repeatedly carried out until the contents of the thinning time counter memory 10 exceed those of the thinning time memory 12, and when exceeded (ST 18 and ST 19), the pulse removing operation is ended; that is, the workpiece 5 is machined according to the normal machining program (ST 20).

In the above-described second embodiment, the data are applied to the memories 11a and 12a by using the keyboard 13. However, the invention is not limited thereto or thereby; that is, the application of those data may be carried out by using an external device. In addition, the kinds and numbers of memories can also be changed freely within the scope of the invention.

The term "start machining conditions" as used herein is intended to mean the machining conditions provided at the start of an electric discharge machining operation—chiefly discharge current (including pulse width, polarity, "on" time and "off" time)—which are set for a workpiece at the start of an electric discharge machining operation.

A plurality of machining conditions, and a plurality of voltage pulse thinning amounts in correspondence to the machining conditions have been stored in the memory. Therefore, a voltage pulse thinning amount corresponding to the start machining conditions can be determined by referring the machining conditions set at the start of the electric discharge machining operation, or the thinning time also set to the plurality of machining conditions stored in the memory.

This is because the frequency of occurrence of short-circuit depends on the machining conditions.

For instance, the frequency of occurrence of short-circuit is high when the electric discharge energy is high, or the voltage pulse applied is high in frequency.

In the case where the electric discharge energy is high, the waste particles formed by each electric discharge are large in size, and the Joule heat generated thereby is also high, the electrode and the workpiece are greatly inflated as a result.

In the case where the voltage pulse applied is high in frequency, the occurrence of electric discharge is short in period. As a result, the quantity of waste materials formed per unitary time is large, and the Joule heat generated by electric discharge is also high because of the high frequency.

Accordingly, in the case where the machining conditions are of high electric discharge energy, the pulse thinning amount must be increased as much, and so must be in the case where the voltage pulse applied is high. (The pulse thinning time is increased.)

When the electric discharge energy is low, or the voltage pulse is low in frequency, the pulse thinning amount is decreased. (The pulse thinning time may be short.)

Thus, the pulse removing operation performed suitably according to the start machining conditions reduces the frequency of occurrence of short-circuit, and allows the electric discharge to uniformly spread from one point with high efficiency.

Figure 8:
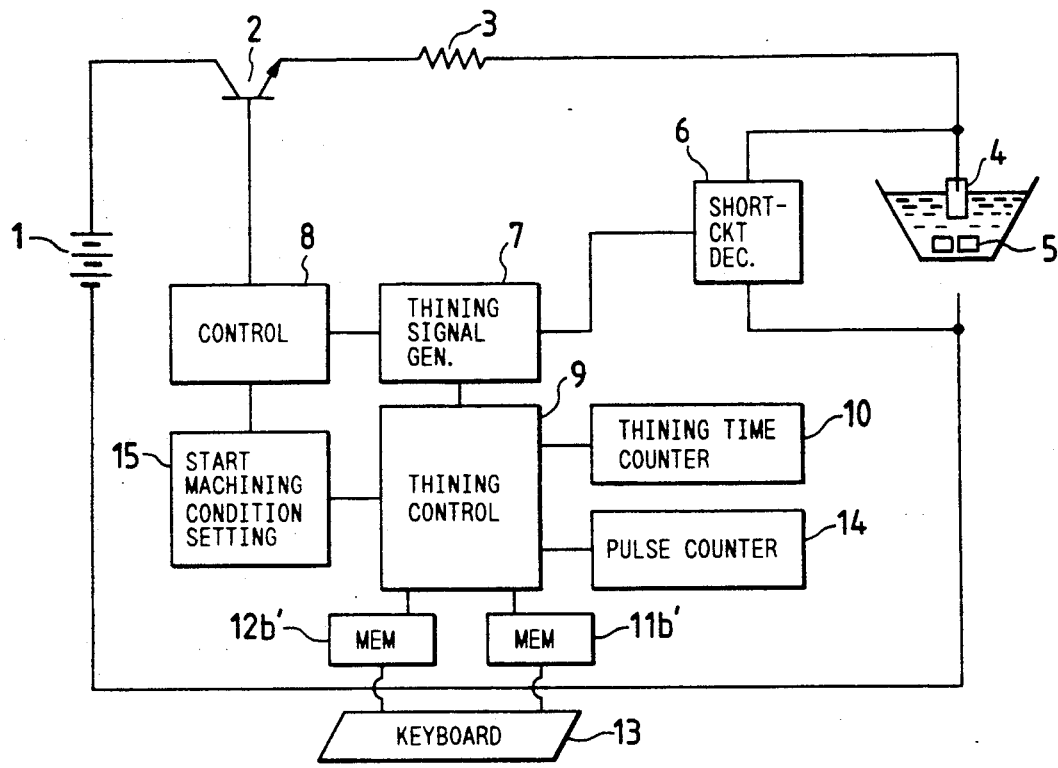
FIG. 8 is a block diagram showing the arrangement of a third embodiment of the invention.
Figure 9:
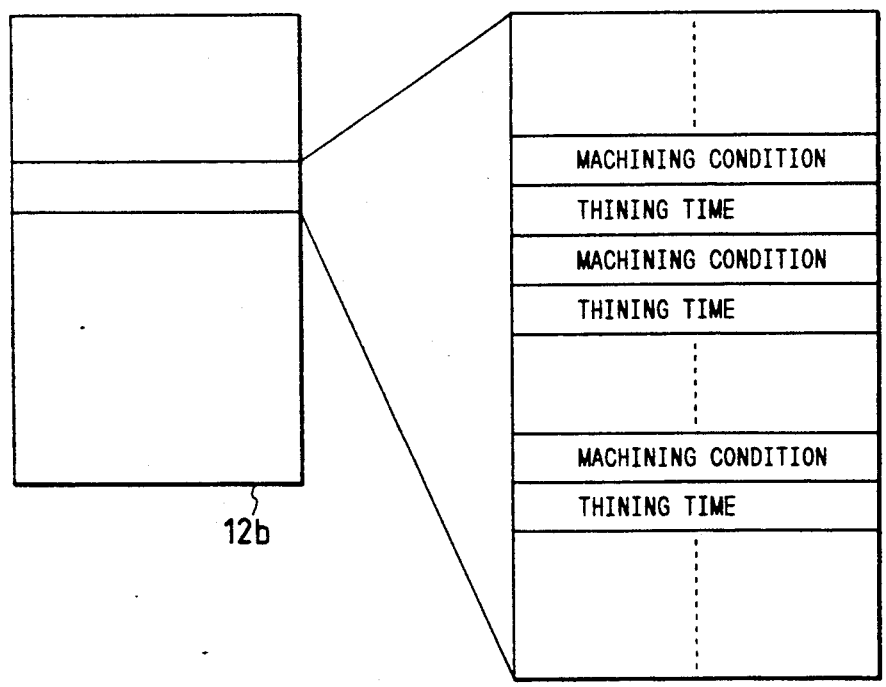
FIG. 9 is an explanatory diagram showing the contents of a memory in the third embodiment.
Figure 10:
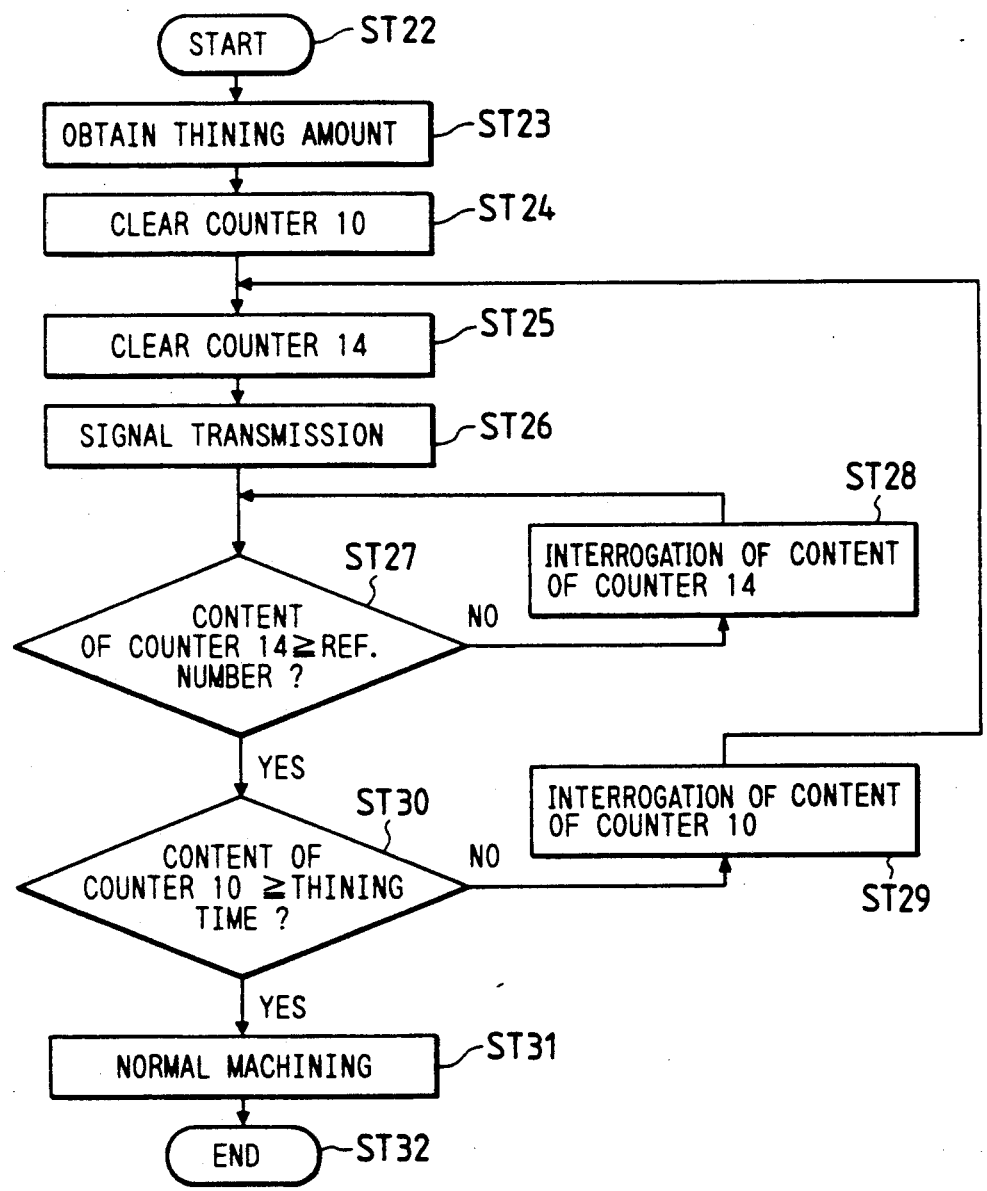
FIG. 10 is a flow chart for a description of the operation of the third embodiment.

FIG. 8 is a block diagram showing the arrangement of a third embodiment of the invention. FIG. 9 is an explanatory diagram showing the contents of a memory in the third embodiment. FIG. 10 is a flow chart for a description of the operation of the embodiment. In FIG. 8, reference numerals 1 through 10 and 13 through 15 designate the same items as those in FIG. 5. Further in FIG. 8, reference character 11b designates an applied voltage thinning amount memory; and 12b, a machining condition and thinning time train memory.

As shown in FIG. 9, a variety of machining conditions, and a variety of interelectrode voltage thinning times in correspondence to the former have been stored in the machining condition and thinning time train memory 12b.

The operation of the third embodiment of the invention is as indicated in the flow chart of FIG. 10. At the start of an electric discharge machining operation (ST 22), the thinning control means 9 extracts the most suitable applied voltage thinning amount out of the contents of the memory 12b according to the data provided by the start machining condition setting means 15 (ST 23), clears the contents of the thinning time counter memory 10 and the pulse counter memory 14 (ST 24 and ST 25), and applies an instruction signal to the thinning signal generating device 7 (ST 26). In response to the signal, the pulse thinning operation is carried out. At the same time, the thinning control means 9 interrogates the count value of the pulse counter memory 14 until it exceeds the reference number of pulses (ST 27 and ST 28), so as to determine the accomplishment of one cycle of operation.

This one cycle of operation is repeatedly carried out until the contents of the thinning time counter memory 10 exceeds the thinning time, and when exceeded (ST 29 and ST 30), the pulse removing operation is ended; that is, the workpiece 5 is machined according to the normal machining program (ST 31).

As is apparent from the above description, in the embodiment, a plurality of machining conditions, and a plurality of voltage pulse thinning amounts in correspondence to the machining conditions have been stored in pair in the memory. Therefore, a voltage pulse thinning amount corresponding to the start machining conditions can be determined by referring the machining conditions set at the start of the electric discharge machining operation, or the thinning time also set to the plurality of machining conditions stored in the memory.

In the above-described embodiments, the voltage pulse thinning method is employed to reduce the electric discharge energy. In the method, for instance an applied voltage pulse thinning amount is (3, 5) means that the electric discharge energy is reduced to three-fifths (3/5) during machining. This energy can be reduced by deceasing the duty factor (on/(on+off)). Hence, reduction of the energy can be achieved by other methods, by suspending the application of the voltage pulses for a certain period of time, decreasing the frequency of the voltage pulses, or physically increasing the intervals of the voltage pulses.

In the above-described embodiment, the conditions making the machining operation unstable reside in the machining start conditions; that is, the machining operation becomes unstable at the start of the electric discharge machining operation. In this connection, the interelectrode conditions, which are the conditions in the space between the electrode and the workpiece, may be employed. This will be described, as a fourth embodiment of the invention, with reference to FIGS. 11 through 15 in more detail.

Figure 11:
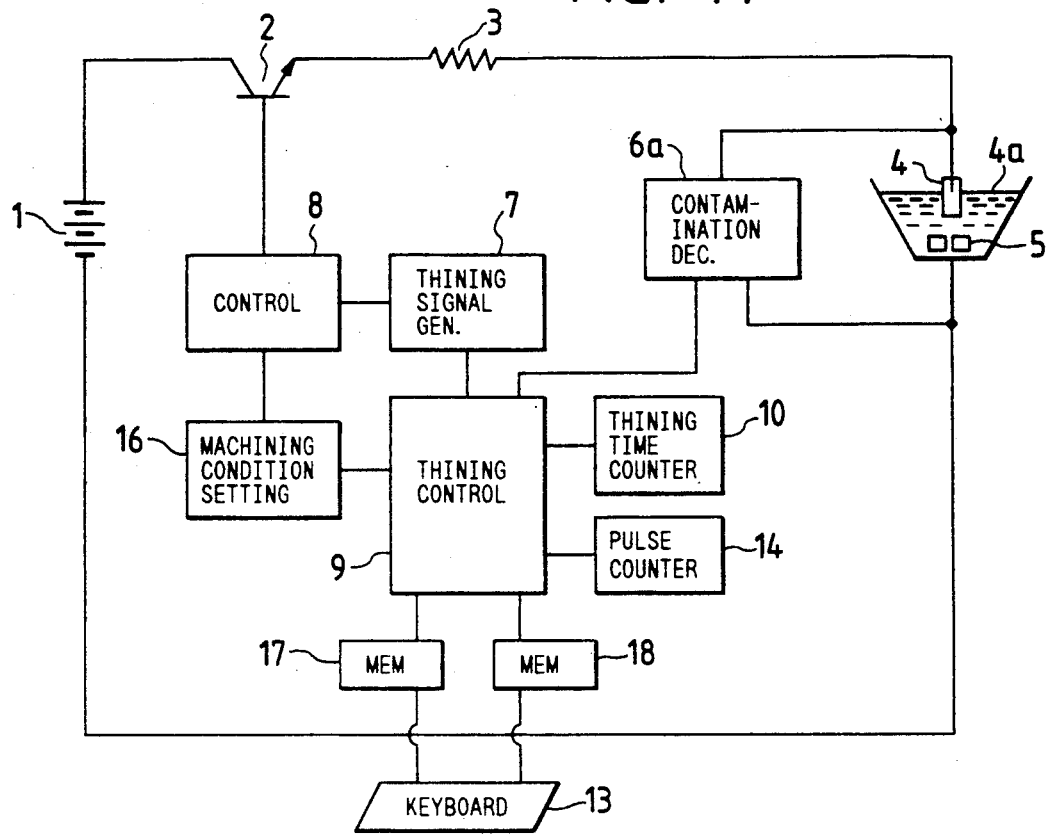
FIG. 11 is a block diagram showing the arrangement of a fourth embodiment of the invention.
Figure 12:
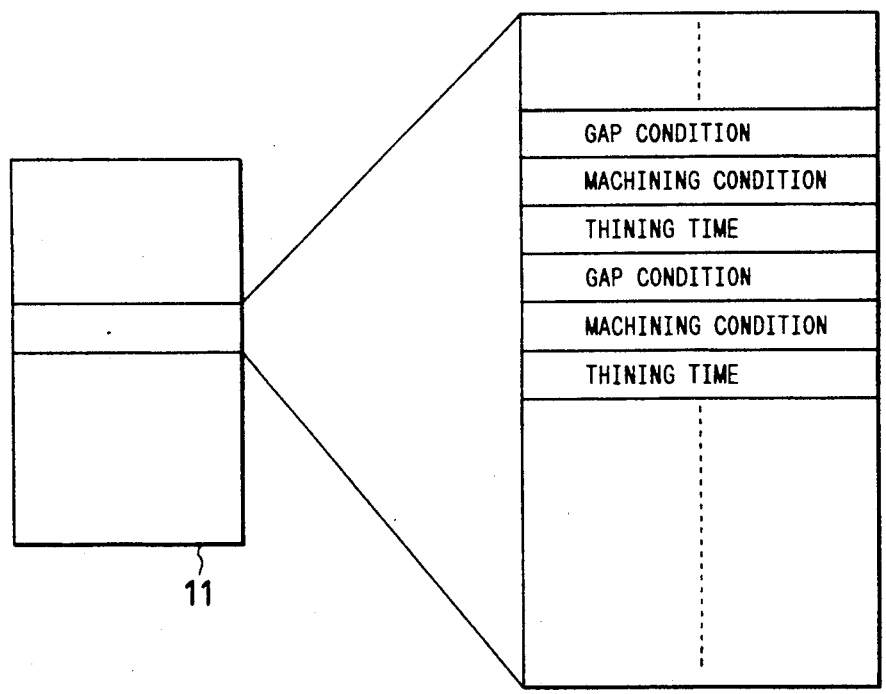
FIG. 12 is an explanatory diagram showing the contents of a memory in the fourth embodiment.
Figure 13:
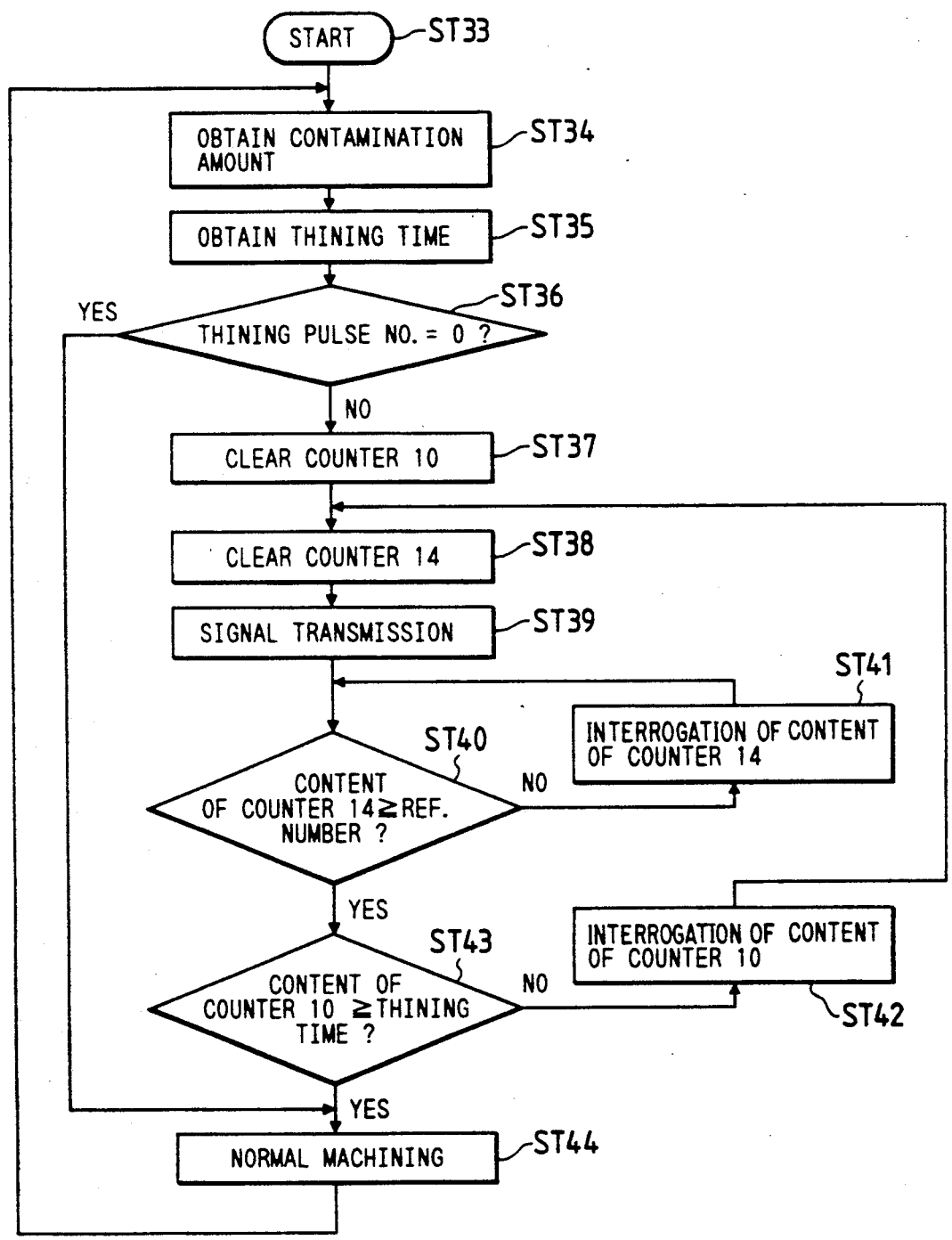
FIGS. 13 and 14 are flow chart for a description of the operation of the fourth embodiment.
Figure 14:
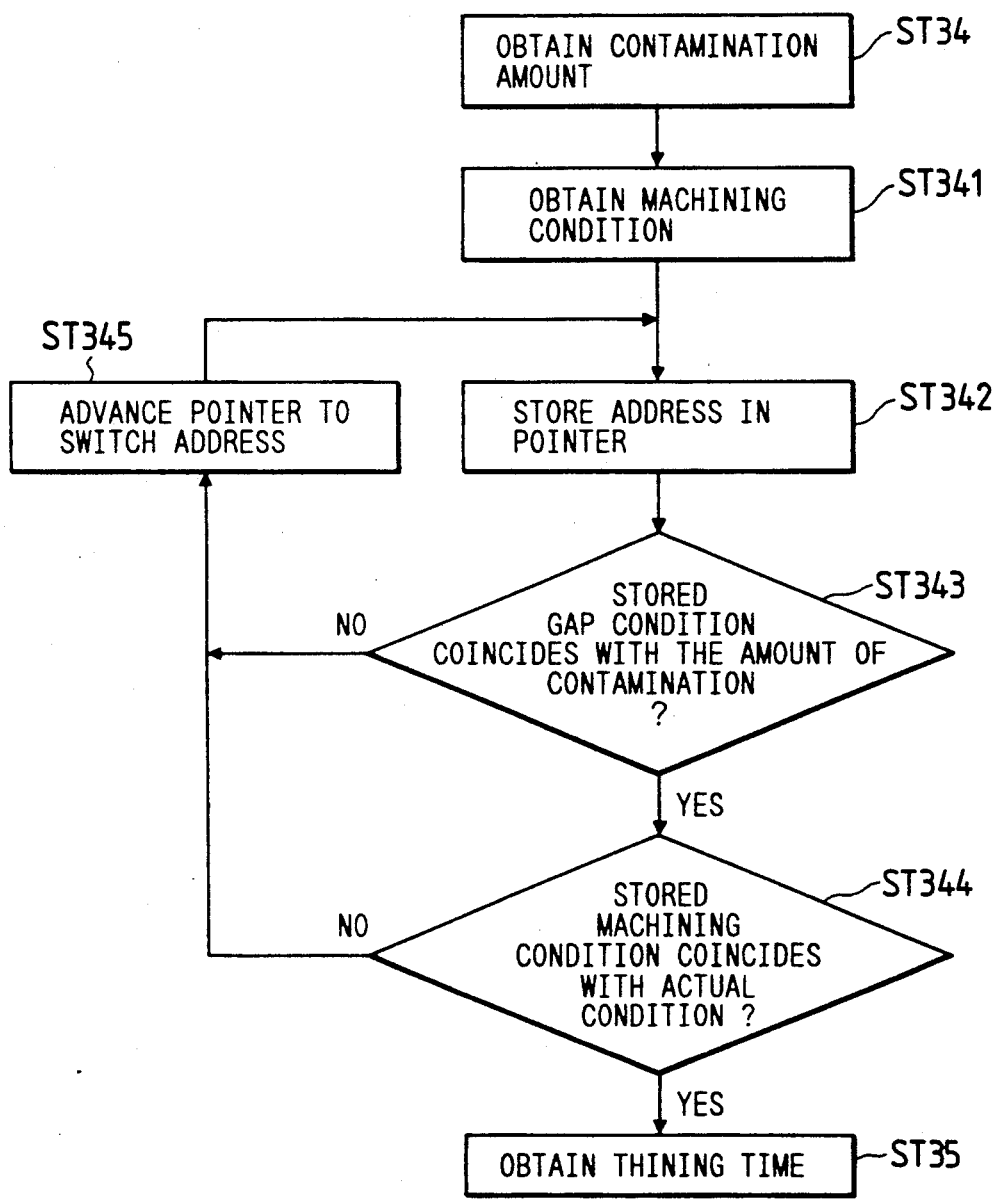

FIG. 11 is a block diagram showing the arrangement of the fourth embodiment. FIG. 12 is an explanatory diagram showing the contents of a memory in the embodiment. FIGS. 13 and 14 are flow charts for a description of the operation of the embodiment.

In FIG. 11, reference numerals 1 through 5, 7 through 10, 13 and 14 designate the same components as those in FIG. 5. Further in FIG. 11, reference character 6a designates a contamination amount detecting means; 16, a machining condition setting means; 17, a thinning data train memory; and 18, a thinning amount memory 18. Interelectrode conditions, machining conditions, and thinning times have been stored in the thinning amount memory 18.

The flow chart of FIG. 13 shows the control operation of the thinning control means 9. As shown in FIG. 13, in Step 34 (ST 34) an amount of contamination is obtained. This will be described in more detail (FIG. 15).

In order to determine whether or not an interelectrode state makes an electric discharge machining operation unstable, there is a method of detecting the interelectrode state. One example of the method is to detect an amount of contamination. This method will be described. During machining, the gap between the electrode and the workpiece is so controlled as to maintain the voltage therebetween substantially uniform, depending greatly on the quantity of sludge accumulated between the electrode and the workpiece. Increase of the quantity of sludge allows secondary electric discharge to occur readily, and therefore it is necessary to adjust the gap between the electrode 4 and the workpiece 5 to maintain the voltage across the workpiece and the electrode constant.

FIG. 15(a), the quantity of sludge is relatively small, and the distance (gap) between the electrode and the workpiece is $x_1$. In FIG. 15(b), the quantity of sludge is relatively large, and the distance therebetween is $x_2$. As is apparent from comparison FIGS. 15(a) and 15(b), $(x_2 - x_1)$ is an amount of return of the electrode, which is the aforementioned "amount of contamination".

Thinning times corresponding to amounts of contamination and machining conditions have been stored in the memory 17, and thinning amounts have been stored in the memory 18, in advance. It is assumed that the thinning amounts and the thinning times have been specified. At the start of a machining operation (ST 33), the contamination amount detecting means 6a operates to detect the amount of contamination (ST 34). According to the amount of contamination thus detected. the thinning control means 9 reads a thinning time out of the thinning data train memory 17 (ST 35). If the number of pulses to be removed is zero (0) (ST 36)t is determined that no pulses are removed, and the machining operation is normally carried out. If, on the other hand, the number of pulses to be removed is not zero (0), then the thinning control means operates to clear the contents of the thinning time counter 10 and the pulse counter 14 (ST 37 and ST 38), and supplies a signal to the thinning signal generating device 7 (St 39), which outputs a thinning signal. The thinning signal is applied to the control device 8. As a result, the transistor 1 is rendered non-conductive for a period of time corresponding to the number of pulses to be removed beginning from the next pulse, thereby to perform the pulse removing operation. At the same time, the thinning control means 9 interrogates the count value of the pulse counter memory 14 until it exceeds the reference number of pulses (ST 40 and ST 41), so as to determine the accomplishment of one cycle of operation. The one cycle of operation is repeatedly carried out until the contents of the thinning time counter memory 10 exceeds the thinning time, and when exceeded (ST 42 and ST 43), the pulse removing operation is ended; that is, the workpiece 5 is machined according to the normal machining program (ST 44). And the contamination-amount detecting operation is carried out again.

As was described above, the amount of contamination is utilized to detect the machining condition, whereby the conditions which may make the machining operation unstable are detected before the occurrence of abnormal conditions such as short circuits. More specifically, it is detected when the quantity of sludge increases to a certain value, so that the voltage pulse thinning operation is carried out for the thinning time preset according to the conditions which may make the machining operation unstable.

In the above-described embodiment, the thinning times are stored in the memory 17. However, it goes without saying that, in addition to the thinning times, the thinning amounts and other relevant conditions may be stored in it.

The method of extracting a thinning time (ST 35) will be described with reference to FIG. 14 in more detail.

The amount of contamination, which a condition of the interelectrode gap (ST 34), and then the predetermined machining conditions are obtained (ST 341). Thereafter the first address in the thinning data train memory 17 is stored in a pointer, for instance another address provided for storing address data (ST 342).

It is determined whether or not the stored interelectrode condition specified by the pointer coincides with the amount of contamination thus detected (ST 343). When it is determined that the former coincides with the latter (or "yes"), then the machining conditions stored are compared with those in use (ST 344), so as to select the thinning time stored at the address of the conditions coincided (ST 35).

If the interelectrode conditions are not coincident with at least one of the machining conditions, the pointer is advanced to switch the address (ST 345) for comparison with the next data.

As was described above, in the embodiment, before occurrence of abnormal conditions, the electric discharge energy is forcibly reduced according to the interelectrode condition and the machining conditions. Therefore, the machining operation is carried out stably at all times, and the machining time is reduced accordingly.

Figure 17:
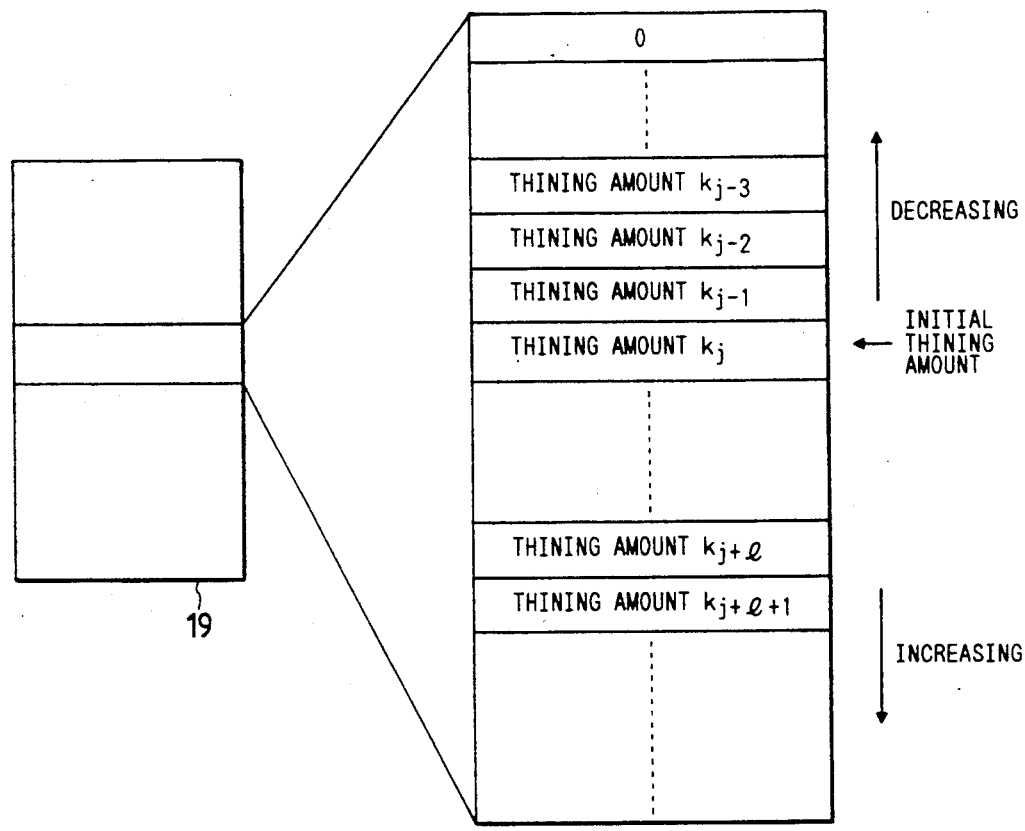
FIG. 17 is an explanatory diagram showing the contents of a memory in the fifth embodiment.
Figure 21:
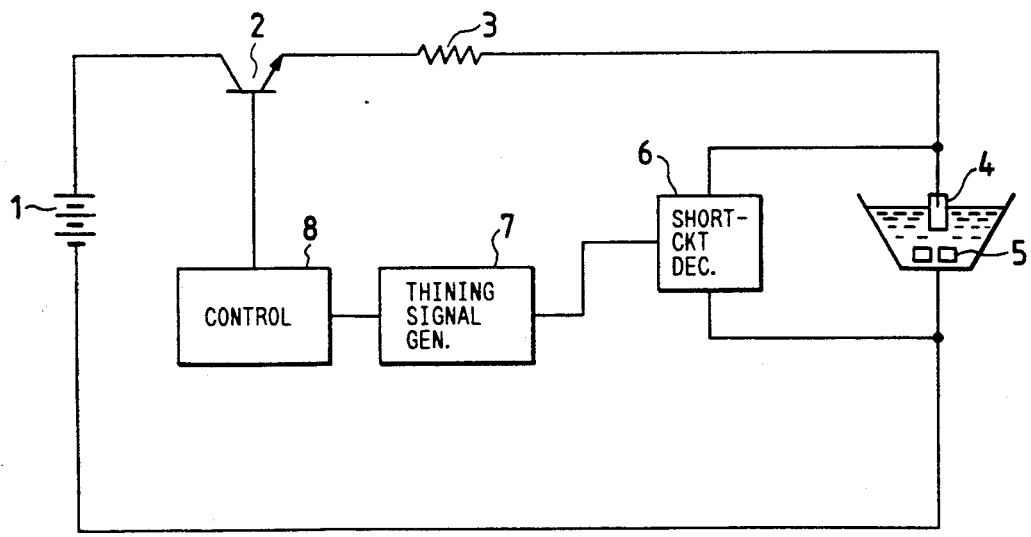
FIG. 21 is a block diagram showing the arrangement of a conventional electric discharge machine.
Figure 18:
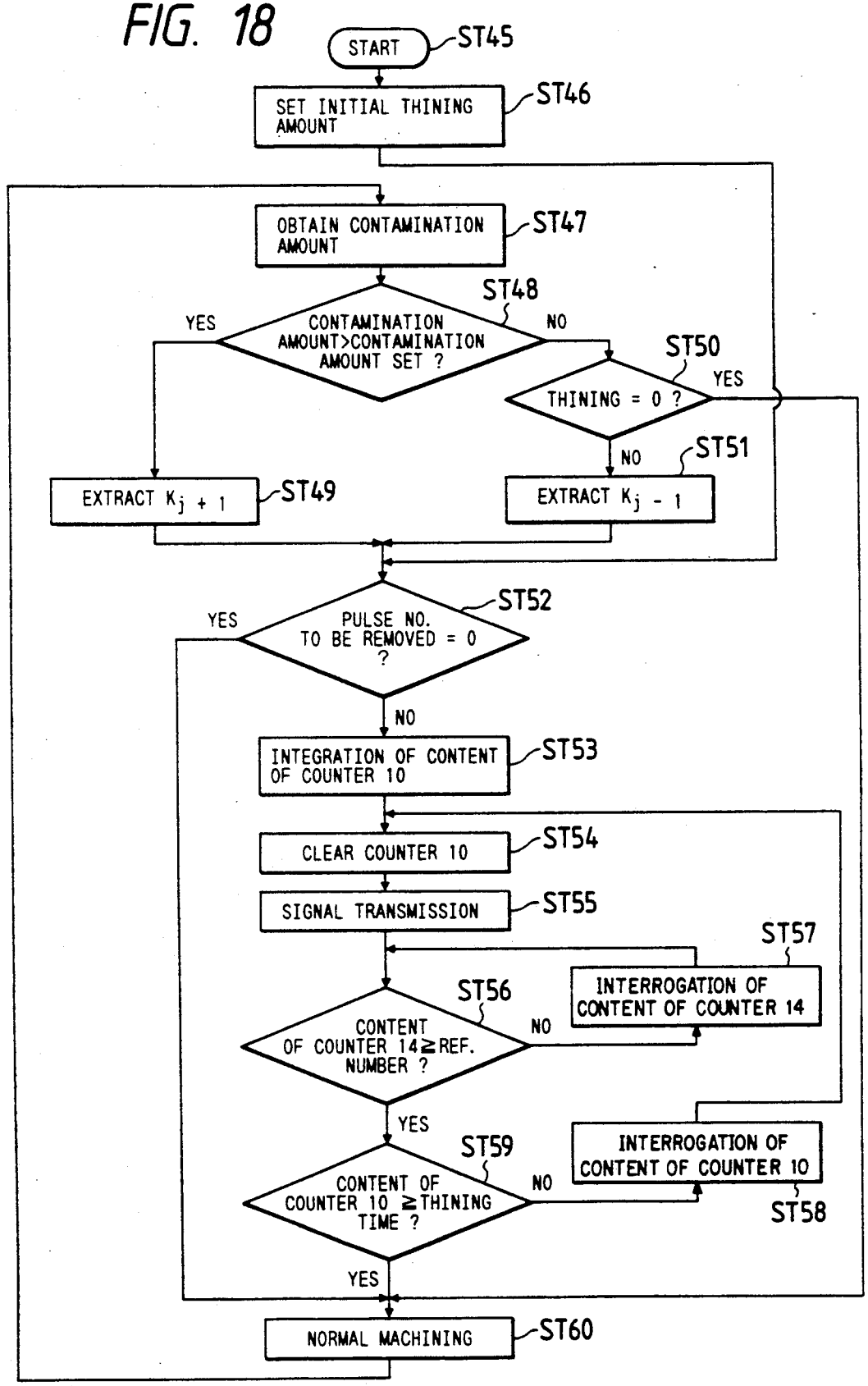
FIG. 18 is a flow chart for a description of the operation of the fifth embodiment.

Now, a fifth embodiment of the invention will be described with reference to FIGS. 16, 17 and 18.

In FIG. 16, reference numerals 1 through 5, 7 through 10, 13 and 14 designate the same components as those in FIG. 5. Further in FIG. 16, reference character 6a designates a contamination amount detecting means; 6b, a comparator; 6c, a limit contamination amount memory; 19, a thinning amount train memory; and 20, a thinning time memory. Thinning amounts are stored stepwise in the memory 19. Thinning times are stored in the memory 20.

The operation of the fifth embodiment thus constructed will be described with reference to FIG. 18. At the start of a machining operation (ST 45), the thinning control means 9 operates to set an initial thinning amount (ST 46).

If the number of pulses to be removed which has been set is zero (0), then the machining operation is normally carried out. If, on the other hand, the number of pulses to be removed is not zero (0), then the thinning control means operates to clear the contents of the thinning time counter 10 and the pulse counter 14 (ST 53 and ST 54), and supplies a signal to the thinning signal generating device 7 (St 55), which outputs a thinning signal. In response to the thinning signal, the control device 8 controls the transistor 1 to perform the pulse removing operation. At the same time, the thinning control means 9 interrogates the count value of the pulse counter memory 14 until it exceeds the reference number of pulses (ST 56 and ST 57), so as to determine the accomplishment of one cycle of operation when exceeded. The one cycle of operation is repeatedly carried out until the contents of the thinning time counter memory 10 exceeds the thinning time (20), and when exceeded (ST 58 and ST 59), the pulse removing operation is ended; that is, the workpiece 5 is machined according to the normal machining program (ST 60). Then the contamination amount detecting means 6a detects the amount of contamination, and the comparator 6b compares the amount of contamination with a reference amount of contamination (ST 46 and ST 47). When the amount of contamination is larger than the reference amount of contamination, the comparator 6b determines that the machining condition is unsatisfactory or a large amount of sludge is deposited, to apply a signal "1" to the thinning control means 9; and when the amount of contamination is equal to or smaller than the reference amount of contamination, then the comparator 6b determines that the machining condition is satisfactory, to apply a signal "−1" to the thinning control means 9. Upon reception of the signal "1", the thinning control means 9 extracts (kj+1), which is higher in the amount of thinning by one step, out of the thinning amount train memory 19 (ST 49), to perform the pulse thinning operation. When, upon reception of the signal "−1", the number of pulses to be removed is not zero (0), then the thinning control means 9 extracts (kj−1), which is lower in the amount of thinning by one step (ST 50 and ST 51), to perform the pulse thinning operation.

The above-described operations are repeatedly carried out until the end of the machining operation. In the embodiment, it is detected when the amount of contamination; i.e., the quantity of sludge is increased to make the machining conditions unstable, and the formation of sludge is suppressed by decreasing the electric discharge energy. When the quantity of sludge is decreased, the electric discharge energy can be increased stepwise to the degree that it can be determined from the machining conditions specified that the machining operation can be stably carried out.

That is, by monitoring the amount of contamination, the machining operation can be carried out with the quantity of formation of sludge and the amount of removal of sludge being maintained in balance. Hence, the machining operation is carried out stably at all times, with the machining time reduced. Furthermore, as was described above, the electric discharge energy is controlled stepwise, and therefore the machining operation will not suffer from abrupt change.

The formation of sludge depends greatly on the machining conditions. The quantity of sludge in the interelectrode gap, which permits a stable machining operation also depends on the machining conditions.

In general, in the case where the electric discharge energy is high, the voltage across the electrode and the workpiece is lower than that in the case where the electric discharge energy is low. Accordingly, in the former case, the interelectrode gap is also smaller, and therefore it is necessary to reduce the change in the amount of contamination. Accordingly, it is necessary to control the voltage pulse removing operation finely. In the voltage pulse removing operation, a certain number of voltage pulses are removed from the voltage pulse train, thereby to decrease the frequency of occurrence of electric discharge per unitary time. When, on the other hand, the electric discharge energy is high, the voltage across the electrode and the workpiece is also high, and therefore the interelectrode gap is large and the amount of contamination varies greatly.

Thus, an amount of contamination to be set (in a range permitting a stable machining operation) also depends on the machining conditions predetermined.

Figure 19:
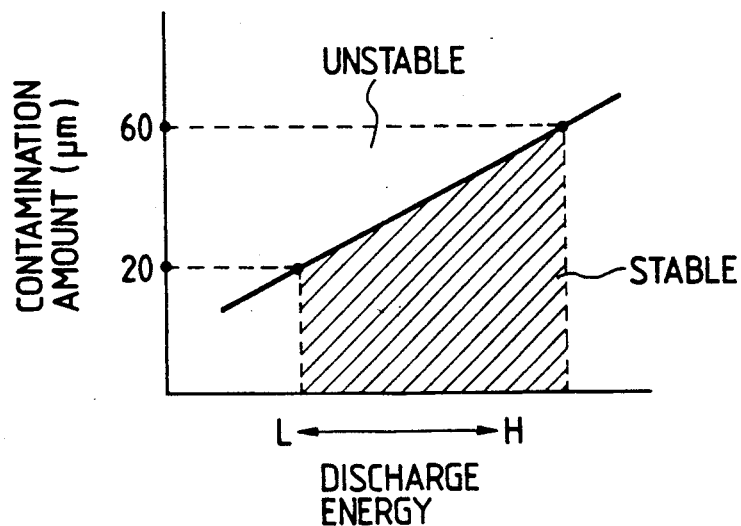
FIG. 19 is a graphical representation indicating amounts contamination with electric discharge energy in the invention.

This will be described with reference to FIG. 19 by way of example. In the case where the electric discharge energy is low, the amount of contamination is in a range of 15 to 25 μm in maximum with a peak current value of 5 A, a no-load voltage of 80 V, and an interelectrode gap of 30 to 50 μm. In the case where, on the other hand, the electric discharge energy is high, the amount of contamination is of the order of 50 to 75 μm in maximum with a peak current of 25 A, no-load voltage of 80 V, and interelectrode gap of 100 to 150 μm. Those data are plotted into a characteristic curve shown in FIG. 19. Therefore, if, in FIG. 19, the amount of contamination to be set is selected in the region "stable condition" and near the limit value of the amount of contamination, then the machining time can be minimized.

In the above-described embodiment, the interelectrode voltage thinning amount train (19) and the interelectrode voltage thinning times (20) may be inputted by using the keyboard 13, or by using other external equipment, or they may be stored in the memories in advance. In addition, the kinds and the number of memories may be freely changed within the scope of the invention.

Furthermore, in the embodiment, the amount of contamination is used to detect whether or not the machining operation is carried out satisfactorily; however, it goes without saying that other data may be employed for the same purpose.

Figure 20:
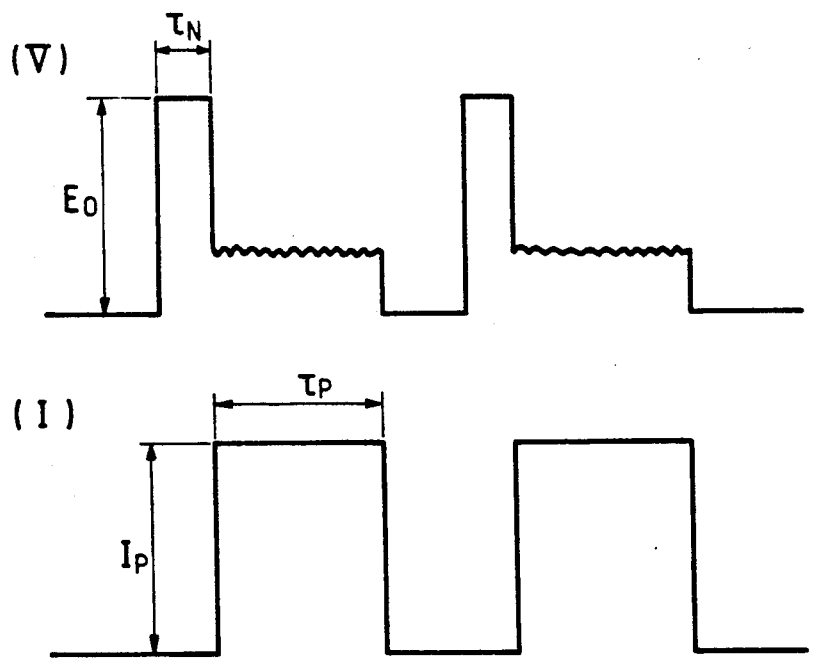
FIG. 20 is a waveform diagram for a description of one example of a machining state detecting method in the invention.
Figures 22A, 22B, 22C, 22D:
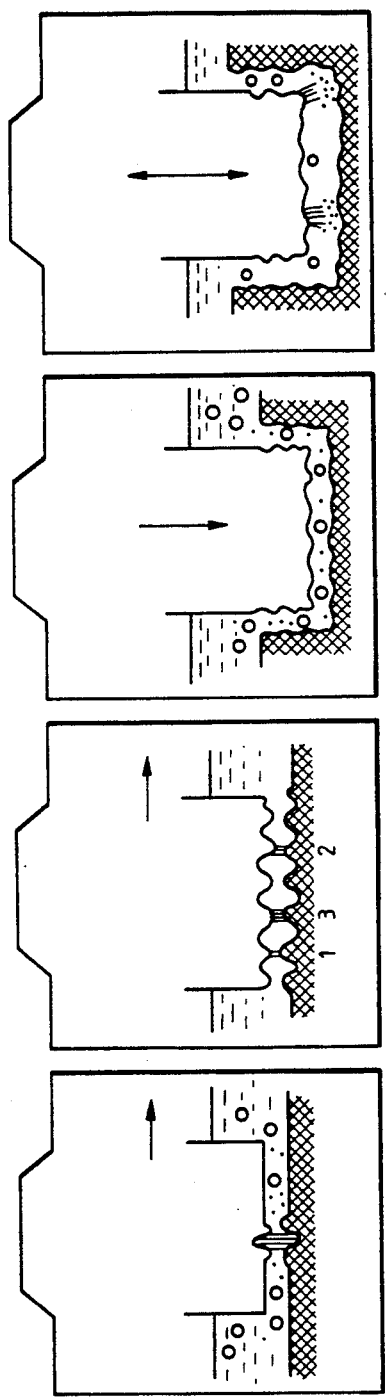
FIGS. 22(a), 22(b), 22(c), 22(d), and 23 are diagrams for a description of the operation of the conventional electric discharge machine.
Figure 23:
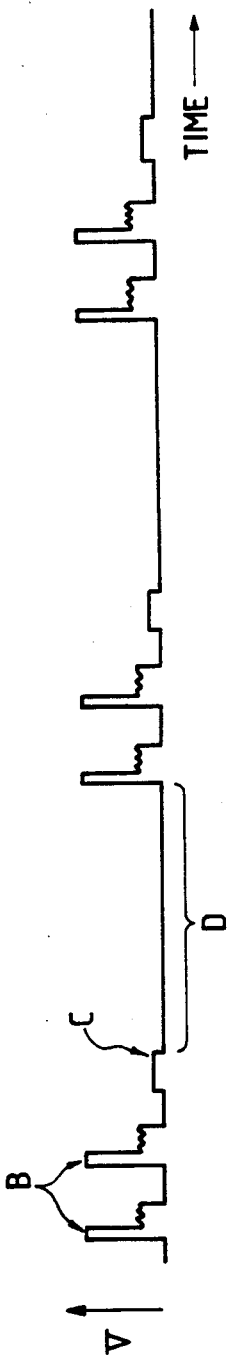

One example of such a detection method will be described with reference to FIG. 20, a waveform diagram. In the method, it is determined from the waveforms of current or voltage whether or not the machining operation is being performed satisfactorily. In FIG. 20, reference character $E_0$ designate a no-load voltage; $T_N$, the duration time of the no-load voltage; $I_P$, a peak current; and $\tau_P$, the duration time of the peak current. If, in FIG. 20, the no-load voltage ($E_0$) is lower than 75 V, or the duration time ($\tau_N$) is shorter than 20 μsec, then it can be determined that the electric discharge is liable to become unstable. Depending on the machining conditions, a plurality of such threshold levels may be provided. The above-described detecting means is advantageous in that it needs no special devices.

As was described above, according to the invention, the machining energy is reduced as long as the conditions of making the machining operation unstable exist. In addition, the machining state is detected, so that the machining operation is carried out with the machining energy corresponding to the machining state thus detected and the machining conditions predetermined. Furthermore, according to the invention, the machining energy is adjusted so as to maintain the machining state as required. Therefore, in the electric discharge machining method of the invention, the machining operation is maintained stable with high machining efficiency at all times.

What is claimed is:

1. An electric discharge machining method in which an electric discharge is generated in a gap between an electrode and a workpiece by applying a pulse voltage across the gap to thereby machine said workpiece, the gap being filled with a machining solution, comprising the steps of:
    selecting a condition which tends to place the gap between said electrode and workpiece in an unstable state for machining said workpiece;
    setting a period of time for which the condition selected lasts; and
    reducing the discharge energy provided by the pulse voltage for the period of time thus set when the condition is detected.

2. The method as claimed in claim 1 wherein the condition which tends to place the gap between said electrode and workpiece in an unstable state in machining said workpiece occurs at the start of a machining operation.

3. The method as claimed in claim 2 wherein the machining is started with said electrode being in an initial state.

4. The method as claimed in claim 2 wherein the machining is started with said machining solution being renewed.

5. The method as claimed in claim 1 wherein an amount of reduction of the electric discharge energy of said pulse voltage is determined in correspondence to machining conditions set for machining said workpiece.

6. The method as claimed in claim 5 wherein the amount of reduction of the electric discharge energy is carried out by removing a predetermined number of pulses for each unit of time.

7. An electric discharge machining method in which an electric discharge is generated in a gap between an electrode and a workpiece by applying a pulse voltage across the gap to thereby machine said workpiece, the gap being filled with a machining solution, comprising the steps of:
    detecting a state of said gap between said electrode and workpiece; and
    changing the electric discharge energy of said pulse voltage stepwise so that said state thus detected is maintained equal to a reference state which has been set to machine said workpiece stably, wherein said reference state is selected substantially near a threshold amount between a stable machining state and an unstable machining state.

* * * * *